Dec. 26, 1933.  H. R. TEAR  1,941,138
LUBRICATING DEVICE
Filed Dec. 13, 1932
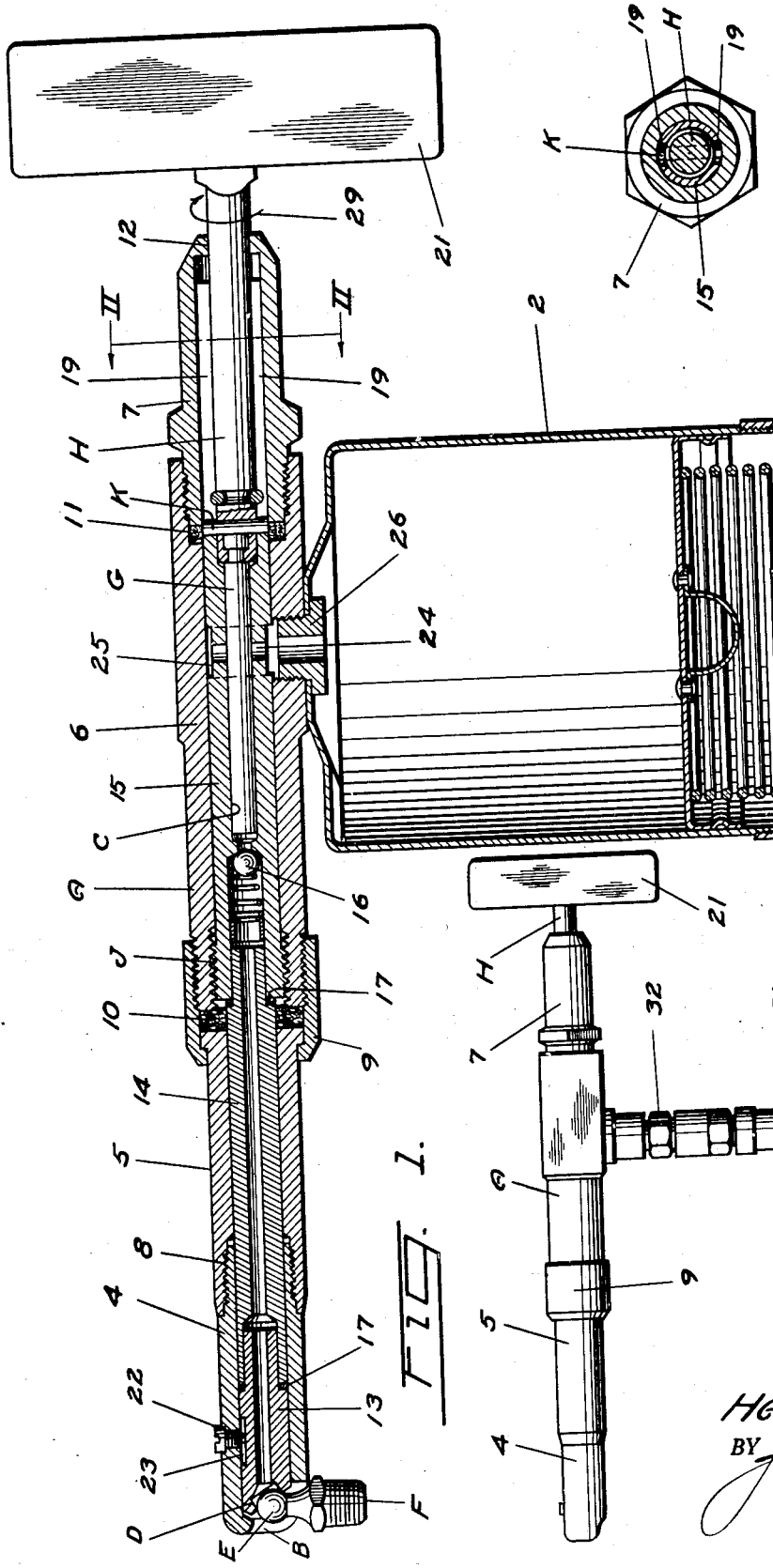
INVENTOR.
HARRY R. TEAR
BY John A. Watson
ATTORNEY.

Patented Dec. 26, 1933

1,941,138

UNITED STATES PATENT OFFICE 1,941,138

LUBRICATING DEVICE

Harry R. Tear, South Bend, Ind., assignor to The Lubrication Corporation, South Bend, Ind., a corporation of Delaware Application December 13, 1932
Serial No. 647,013

13 Claims. (Cl. 221—47.4)

This invention relates to improvements in lubricating devices and, more particularly, to lubricant guns or boosters incorporating discharge nozzles for clamping engagement with a lubricant receiving fitting.

An object of the invention is to provide a lubricant gun or booster having a mechanical clamp nozzle wherein the clamping mechanism of the nozzle and the gun or booster high pressure piston may be independently operated by a single manually operable member.

Another object is to provide a lubricant gun or booster as described wherein the clamping engagement between the nozzle and lubricant receiving fitting is unaffected by variations in developed lubricant pressure.

A further object is to provide, in a gun or booster having a clamp type nozzle, visible indication, by piston hand grip position, of the relative open and closed positions of the elements of the clamping mechanism.

Other objects, the advantages and uses of the invention will be or should be apparent after a reading of the following description and claims and after considering the accompanying drawing, in which:

Fig. 1 is a sectional view of a hand lubricant gun constructed in accordance with the invention;

Fig. 2 is a sectional view along the line II—II of Fig. 1; and

Fig. 3 is a side elevation of a lubricant discharge nozzle and booster embodying the features of the invention.

In general, the apparatus selected for illustration herein comprises a barrel A formed at its outer end with fitting engaging clamping jaws B, a pump or booster cylinder assembly providing a cylinder bore C and a discharge orifice D, the walls of which are fashioned to contact with the spherical head E of a lubricant receiving fitting F to form an annular lubricant tight seal therewith upon relative movement of the barrel A and cylinder assembly, a piston G mounted for reciprocation in the cylinder bore C, a manually actuated plunger H for operating the piston G, means including screw threads J on the barrel A and cylinder assembly for causing relative longitudinal movement between the barrel and cylinder assembly when the cylinder assembly is rotated and a pin K on the plunger H for transmitting rotational movement of the plunger to the cylinder assembly.

Referring particularly to Figs. 1 and 2, the hand lubricant gun shown therein is of the type wherein the source of lubricant supply comprises a reservoir 2 forming a part of the gun assembly and differs from that form shown in Fig. 3 only as to this feature.

The barrel A includes four major aligned tubular elements 4, 5, 6 and 7 respectively. The element 4 comprises the forward section of the barrel including the clamping jaw B and is secured to the element 5 by screw threads 8. The element 6 is of greater internal diameter than the elements 4 and 5 and is secured to the element 5 by a collar 9. A washer 10 of yielding material is located between the adjacent ends of elements 4 and 5 and compressed therebetween, to prevent leakage of lubricant and also to introduce friction to prevent the free rotation of element 4, at the same time permitting element 4 to be rotated manually when desired. The elements 6 and 7 are secured together by screw threads 11, packing 12 being interposed between the adjacent ends thereof. The internal diameter of the element 7 is the same as that of the element 6 except for a reduced portion 12 which serves as a guide for the plunger H.

The cylinder assembly includes three aligned sections 13, 14 and 15 respectively, providing a continuous passageway, therethrough, one portion of which comprises the cylinder bore C, which terminates at the forward end in the discharge orifice D. A check valve 16 is located in the passageway immediately forward of the cylinder bore C. Packing washers 17 may be placed between adjacent end portions of the sections 13 and 14 and the sections 14 and 15 respectively. The screw threads J of the cylinder assembly are formed at the forward end of the section 15 and engage with threads J on the inner wall of the forward end of the element 6 of the barrel.

The section 15 of the cylinder assembly is further formed with a pair of parallel and longitudinally extending slots 19 through the side walls thereof within which the ends of the pin K extend. The pin K may be fixed in a bore extending transversely through the plunger H by press fit. This arrangement permits free reciprocation of the plunger H and piston G within the section 15 of the cylinder assembly and serves to impart rotation of the plunger to the section 15, whereupon through the medium of the screw threads J relative longitudinal movement of the barrel A and cylinder assembly may be carried out. In order to facilitate the manual reciprocation and rotation of the plunger H, a hand grip 21 may be fixed to the outer end of the plunger as shown.

A stud screw 22 extends through the side wall of the barrel element 4 and into a key way 23 formed along the outer wall of the member 13 to maintain proper registration between the discharge orifice D and the fitting engaging jaws B. The joints between the sections 13 and 14 and the sections 14 and 15 provide swivel action therebetween and thus relieve any strain upon the section 13 through torque applied to the plunger H.

The lubricant inlet port for the cylinder C includes a passageway 24 extending transversely through the section 15 and intersecting the cylinder bore C and an annular groove 25 formed about the outer wall of the section which is at all times in communication with the bore of an inlet stud 26 extending through the wall of the barrel A and into the reservoir 2. The stud 26 may be employed to permanently attach the reservoir to the gun barrel as shown.

In operation the operator may hold the gun by grasp upon the hand grip 21. The position of the hand grip relative to its axis of rotation will serve to indicate whether the nozzle is in a clamped or unclamped position. Upon initial contact between the walls of the discharge orifice D and the head E of the fitting the plunger H may be rotated in the direction of the arrow 29 to cause relative longitudinal movement of the barrel A and cylinder assembly through the medium of the screw threads J until the head E of the fitting is clamped tightly between the discharge orifice walls and the jaw B. Reciprocation of the plunger through manual actuation of the hand grip 21 may at this time be performed to force lubricant from the reservoir 2 under high pressure into the fitting through the lubricant tight clamping engagement between the gun and fitting, as described.

It should be noted that while the clamping mechanism and the high pressure piston are both operated by the same member, i. e. the hand grip 21 that either may be operated independently of the other or both at the same time. A practical illustration of the latter function would be the retraction of the piston G while turning the hand grip in the direction of the arrow 29 to clamp the nozzle upon the fitting.

In Fig. 3 another embodiment of the invention is illustrated in the form of a discharge nozzle and pressure booster for a relatively low pressure lubricant dispensing or feeding device. The mechanism of the barrel A, the cylinder assembly, clamp nozzle and operating means may be identical to that of the gun of Fig. 1 the sole difference between the two devices being in the substitution of a flexible hose 31 and swivel connection 32 for the reservoir 2. The hose 31 may be connected to any suitable type of pressure feed lubricant apparatus such as an electrically driven pump of the character commonly employed in lubricant servicing stations.

In operation, the piston of the booster may be employed as a valve to close the inlet passageway to the cylinder bore and when high pressures are desired the piston may be reciprocated in the same manner and with the same result as described in connection with the gun of Fig. 1.

It is to be understood that the embodiments of the invention herein set forth are presented for the purpose of illustration only, and various changes may be made therein without departing from the spirit and scope of the appended claims.

I claim:

1. A lubricating device comprising, a high pressure cylinder, a piston mounted for reciprocation in said cylinder, a clamp type discharge nozzle communicating with said cylinder and having mechanism including a pair of relatively movable jaws for clampingly engaging with a lubricant receiving fitting, and means for reciprocating said piston and for operating the clamping mechanism of said nozzle independently of lubricant in said cylinder.

2. A lubricating device comprising, a high pressure cylinder, a piston mounted for reciprocation in said cylinder, a clamp type discharge nozzle communicating with said cylinder and having mechanism including a pair of relatively movable jaws for clamping engagement with a lubricant receiving fitting, and a single control means for reciprocating said piston and for opening and closing the clamping mechanism of said nozzle independently of lubricant in said cylinder.

3. A lubricating device comprising, a high pressure cylinder, a piston mounted for reciprocation in said cylinder, a multiple jaw clamp type discharge nozzle communicating with said cylinder for clampingly engaging with a lubricant receiving fitting, and a single manually operable member for imparting reciprocatory motion to said piston and for mechanically opening and closing the clamping mechanism of said nozzle upon rotational movement of said member.

4. A lubricating device comprising, a barrel, a pump cylinder movably mounted in said barrel, means for admitting lubricant to said cylinder, a piston mounted for reciprocation in said cylinder, cooperating screw threads on said cylinder and said barrel for translating rotation of said cylinder in said barrel into relative longitudinal movement between the cylinder and the barrel, a discharge nozzle of the clamp type communicating with said cylinder, and means operative upon longitudinal movement of said cylinder in one direction relative to said barrel for urging said clamp nozzle into clamping engagement with a lubricant receiving fitting.

5. A lubricating device comprising, a cylinder, a piston mounted for reciprocation in said cylinder, a mechanical clamp type nozzle communicating with said cylinder for clamping engagement with a lubricant receiving fitting, a plunger having a hand grip for operating said piston, and means responsive to rotation of said plunger for operating the clamping mechanism of said nozzle, said means including a slot and pin connection between said cylinder and said plunger for causing the cylinder to rotate with the plunger.

6. A lubricating device comprising, a barrel having a jaw at its outer end for engagement with the head of a lubricant receiving fitting, a pump cylinder mounted for rotation in said barrel, a conduit extending forwardly from said cylinder and terminating in a discharge orifice, the wall of said conduit about said orifice being adapted to engage said fitting head to form a contact seal therewith, a piston in said cylinder, and means responsive to the rotation of said cylinder in said barrel for causing said conduit to move longitudinally in the barrel to clamp said fitting head between said conduit and said jaw.

7. A lubricating device comprising, a barrel having a jaw at its outer end for engagement with the head of a lubricant receiving fitting, a pump cylinder mounted for rotation in said barrel, a conduit extending forwardly from said cylinder terminating in a discharge orifice, the wall of said conduit about said orifice being adapted to engage said fitting head to form a contact seal therewith, a piston in said cylinder, means responsive to the rotation of said cylinder in said barrel for causing said conduit to move longitudinally in the barrel to clamp said fitting head between said conduit and said jaw, and means for reciprocating said piston and for rotating said cylinder at will.

8. A lubricating device comprising a barrel having a jaw at its outer end for engagement with the head of a lubricant receiving fitting, a pump cylinder mounted for rotation in said barrel, a conduit having a swivel connection with and extending forwardly from said cylinder and terminating in a discharge orifice, the wall of said conduit about said orifice being adapted to engage said fitting head to form a contact seal therewith, a piston in said cylinder, and means responsive to the rotation of said cylinder in said barrel for causing said conduit to move longitudinally in the barrel to clamp said fitting head between said conduit and said jaw.

9. A lubricating device comprising, a high pressure cylinder, a piston mounted for reciprocation in said cylinder, a lubricant reservoir for supplying lubricant to said cylinder, a clamp type discharge nozzle communicating with said cylinder for clampingly engaging with a lubricant receiving fitting, a thrust shoulder on said nozzle between said cylinder and said nozzle, and a single manually operable member directly connected to said piston for operating said piston and for urging said cylinder against said thrust shoulder to operate the clamping mechanism of said nozzle.

10. In a lubricating device, a pump cylinder, means for supplying lubricant to said cylinder, a piston mounted for reciprocation in said cylinder, a rod for actuating said piston having a hand grip at its outer end, said cylinder having a portion formed with a slot therein, a pin in said rod extendable into said slot whereby the rod may reciprocate with respect to said cylinder and may transmit rotational movement to the cylinder, and a clamp type nozzle for said cylinder adapted to clampingly engage a lubricant receiving fitting upon rotation of said cylinder.

11. A lubricating device comprising, a lubricant pump, a member for operating said pump, a clamp type lubricant discharge nozzle communicating with said pump, and means interposed between said operating member and said nozzle for imparting clamping action to said nozzle through said pump operating member independently of the operation of said pump.

12. A lubricating device comprising, a lubricant pump, a member for operating said pump, a clamp type lubricant discharge nozzle communicating with said pump, and a thrust member interposed between the clamping instrumentality of said nozzle and said operating member for transmitting thrust developed by said operating member, independently of the operation of said pump, to said clamping instrumentality whereby the nozzle may be clamped upon a fitting by manipulation of said operating member independently of the operation of the pump.

13. A lubricating device comprising, a lubricant pump, a member for operating the pump upon reciprocation of the member, a clamp type discharge nozzle communicating with said pump, and means interposed between the operating member and the clamping instrumentality of the nozzle responsive to the rotation of said operating member for imparting clamping action to said nozzle independently of the operation of the pump.

HARRY R. TEAR.